United States Patent Office 3,554,692
Patented Jan. 12, 1971

3,554,692
RECOVERY OF COPPER AND VANADIUM FROM A SOLUTION CONTAINING IRON
Bernhard D. Brast, Bay City, Tex., and Raymond E. Ory, Union City, N.J., assignors to Celanese Corporation, New York, N.Y., a corporation of Delaware
No Drawing. Filed May 26, 1969, Ser. No. 827,906
Int. Cl. C22b 59/00
U.S. Cl. 23—22                                              10 Claims

ABSTRACT OF THE DISCLOSURE

Dissolved vanadium and copper are recovered from a solution which also contains dissolved iron by contacting the solution with a cation exchange resin in the hydrogen form, whereby the copped and vanadium are accumulated in the ion exchange bed. The bed is eluted periodically with a strong mineral acid, such as nitric acid. The iron is either selectively complexed with a polyphosphate incorporated into the liquid introduced into the bed, whereby the iron is not accumulated in the bed and is instead discharged with the waste liquor, or else alternatively it is allowed to accumulate in the bed to be periodically extracted therefrom by passing a polyphosphate-containing liquid such as polyphosphoric acid through the bed.

BACKGROUND OF THE INVENTION

This invention relates to the field of ion exchange, more particularly to the use of ion exchange in recovering dissolved metal cations, specifically copper and vanadium, from aqueous solutions thereof. The invention also relates to the manufacture of adipic acid by the catalytic oxidation, with nitric acid, of cyclohexanone, cyclohexanol, or mixtures thereof. In particular the invention relates to an ion exchange process for recovering copper, vanadium, or both from the catalyst-containing waste liquors resulting after the adipic acid has been recovered following said nitric acid oxidation process.

The invention also relates to the recovery of vanadium, copper, or both from the inorganic residues, such as ash, obtainable from the combustion or chemical processing of fossil fuels such as coal or petroleum.

The relevant prior art insofar as adipic acid is concerned is exemplified by U.S. Pats. Nos. 2,791,566; 3,106,-450; and 3,186,952. These three patents describe the nature of the problem, which is that the copper-vanadium catalyst employed in producing adipic acid by nitric acid oxidation is of substantial monetary value and, for optimum economy in carrying out the process industrially, must be recovered (for reuse) from the waste liquors obtained after the adipic acid has been crystallized and recovered from the oxidation reaction product, which waste liquors comprise aqueous nitric acid containing dissolved copper and vanadium along with organic by-products such as lower alkanedioic acids as exemplified by glutaric acid and succinic acid. U.S. 2,791,566 describes a process comprising the addition of a non-volatile mineral acid to these waste liquors followed by evaporation and recovery of the catalyst and by-products from the evaporation residue. U.S. Pat. 3,106,450 describes the use of ion exchange, preceded by pH adjustment, to recover the copper and vanadium from the same type of waste liquor. Of the two patents just described, neither teaches a method for dealing with the problem of iron contamination, however, which contamination results from the fact that at various points within the adipic acid production plant ferrous alloys such as stainless steel are employed. This results in the accumulation of quantities of iron in the process streams, which ultimately reach such a level as to contaminate the adipic acid product to an intolerable degree.

This iron contamination must, therefore, be removed, but the processes of U.S. Pats. 2,791,566 and 3,106,450 do not include provision for coping with this problem. Specifically, in both of these processes any iron which may be present is accumulated with the recovered copper and vanadium.

U.S. Pat. 3,186,952 recognizes the iron problem and presents a method for coping with it which consists essentially of employing two resin beds in series, iron being allowed to accumulate in the first bed while the copper and vanadium are accumulated in, and recovered from, the second bed free from iron. This process is effective but requires the use of two beds instead of one, with resulting duplication of auxiliary control equipment. An element of uncertainty is also introduced by the fact that in a practical operating situation complete retention of all the iron in the first bed is not always obtained.

SUMMARY OF THE INVENTION

It is an object of this invention to provide a method for recovering copper, vanadium, or both from a solution which also contains iron, without requiring the use of two ion exchange beds. It is another object to provide an improved method for recovering iron-free copper and vanadium from the waste liquors resulting from the recovery of adipic acid produced by the catalytic nitric acid oxidation of cyclohexanone, cyclohexanol, or both. It is yet another object to provide a method for recovering vanadium or copper, particularly vanadium, from mineral residues, such as ash, derived from fossil fuels such as coal or petroleum. Other objects of the invention will be apparent from the following detailed description and examples.

In accordance with the present invention an aqueous solution containing cations of iron along with non-ferrous cations of at least one member of the group consisting of copper and vanadium is contacted with a cation exchange resin in the hydrogen form. Preferably the resin is employed in the form of a fixed bed. The non-ferrous ions are accumulated in the resin bed by displacing hydrogen ions therefrom and are then periodically recovered from the resin by elution with a strong mineral acid. Contamination of the eluted non-ferrous ions by iron is prevented by making use of a selective iron-complexing agent, e.g. particularly a source of polyphosphate ions such as polyphosphoric acid. This is done by either incorporating a quantity of the, for example, polyphosphoric acid into the solution fed into the resin bed, with the result that the iron ions are complexed and passed through the bed without being collected therein, or else, alternatively, by allowing the iron to accumulate in the bed along with the non-ferrous ions and then, periodically, selectively cleansing the bed of its iron content by passing a polyphosphate-containing solution through the bed whereby the iron is selectively removed in the discharged waste liquor. Maximum recovery of the non-ferrous ions is facilitated by controlling the pH of the liquid passed through the bed between about −0.3 and about 1.8. It has been discovered that, contrary to what might be expected, polyphosphate ions are sufficiently resistant to hydrolysis under these conditions to maintain this iron-complexing capability.

The process of the invention is applicable not only in recovering catalysts used in adipic acid production but also in recovering vanadium from, for example, fly ash, in which event the ash is first dissolved with an acid prior to processing the resulting solution through an ion exchange resin as described above.

DESCRIPTION OF THE PREFERRED EMBODIMENTS

The nature of the cation exchange resin employed in utilizing this invention is not critical, although certain types of resin are preferred over others. Any of the hydrogen-form cation exchange resins disclosed in the prior art for recovering metals such as copper and vanadium can be employed, since polyphosphate, specifically polyphosphoric acid, has no deleterious effect on such resins. Any resin which can be employed in alternating cycles of metal adsorption followed by mineral acid elution as taught in the prior art can also be employed in the present process. For example, U.S. Pat. 3,186,952 characterizes the applicable resins broadly as "water-insoluble polymerizate" cation exchange resins, and this term characterizes broadly the resins which are also applicable in the present process. More particularly the resins employed are those having a base comprising sulfonated polyvinyl aryl compounds which are cross-linked with a divinyl aryl compound. Specifically preferred resins include those which comprise sulfonated polystyrene cross-linked with divinylbenzene in an amount of about 8 to 25 weight percent based on the weight of the resin. Commercially available resins include "Amberlite IR-200" manufactured by Rohm and Haas Company and "Dowex–50WX8," "Dowex–50X16," and "Dow SA1101.1," all manufactured by Dow Chemical Company. Many other similar resins are manufactured and can be utilized in the present process, but the resins just named are typical and illustrate the recommended materials. "Amberlite IR–200" has been found to be particularly suitable.

The geometry of the resin bed, and the space velocity to be employed in passing the aqueous feed solution through it, are not critical, nor is the particle size of the resin.

The bed is, of course, activated to its hydrogen form by treatment with a strong acid prior to passing the aqueous feed solution through it.

The metal ion concentration of the feed solution to be passed through the bed is a significant variable only in that it determines the quantity of feed solution which can be processed through the bed before elution with a strong mineral acid to regenerate the bed becomes necessary. Also, in that embodiment of the invention in which continuous complexation is employed, the concentration of iron in the solution determines the polyphosphate concentration required for effective complexation of all the iron. Specifically, it has been discovered that for complete complexation of the iron it is desirable that, in the solution being processed, the ratio of polyphosphate (expressed as polyphosphoric acid) to dissolved iron be at least about 16:1 to 18:1 by weight. Very heavy concentrations of polyphosphoric acid may tend to complex some of the copper as well as the iron, with some reduction in copper recovery efficiency, but in the low concentrations of polyphosphoric acid which will be used in the continuous-complexing embodiment of the invention (below about 1 weight percent) this effect is not serious.

With further reference to the matter of the concentration of polyphosphate (e.g. polyphosphoric acid), as related to the undesired complexing of copper, concentrations in the range of about 0.02 weight percent are entirely adequate and will normally be employed, particularly in the continuous-complexing embodiment of the invention. If higher concentrations are employed, the degree to which copper is complexed has been found to be a function of polyphosphate concentration. Specifically, the amount of copper lost from the ion exchange bed due to complexing is, when the polyphosphate concentration is about 0.5 weight percent, approximately 1.5 times as great as that which is lost from the bed when the polyphosphate concentration is about 0.02 weight percent. At 2% and 4.5% polyphosphate, the loss of copper through complexing is about 2.5 and 5 times, respectively the loss which is experienced at 0.02 weight percent polyphosphate. It will be seen, then, that there is no sharp break point in this function, and higher concentrations of polyphosphate can be employed, if desired; at the expense of increased losses of copper. It is recommended, however, that the polyphosphate concentration be kept below about 1% by weight in the continuous-complexing embodiment of the invention. In that embodiment in which periodic cleansing of the bed with a polyphosphate is employed, the limitations just described do not apply, especially if the bed is eluted with acid to remove the copper and vanadium prior to the polyphosphate treatment. Even here, however, it is preferable as a practical matter to keep the polyphosphate concentration below about 1% or 2% in order that, after the cleansing cycle, complete removal of the polyphosphate can be more easily effected. That is, a heavy residual polyphosphate concentration in the bed after the cleansing cycle can have the effect of undesirably complexing copper when operation is resumed on the next exhaustion cycle.

When the liquid being processed is a waste liquor derived from the crystallization recovery of adipic acid from the reaction product resulting from the catalytic nitric acid oxidation of cyclohexanone and/or cyclohexanol, the concentration of copper, vanadium, and iron is normally in the range of about 0.1 to 0.3 weight percent copper (as copper), 0.01 to 0.03 weight percent vanadium (vanadyl ions calculated as vanadium), and up to about 20 p.p.m. of iron calculated as iron. Nitric acid is also normally present, in an amount of about 2 to 4 weight percent, as well as lower alkanedioic acids such as glutaric and succinic, as well as some adipic acid, in a total concentration of about 8 weight percent. Lower alkanoic acids are also normally present in low concentrations.

The acidity of the solution to be passed through the ion exchange bed should be controlled within certain limits in order that satisfactory accumulation of copper and vanadium into the ion exchange bed shall take place. The limiting factor here is that the pH of the solution contacted with the resin bed should be about 1.8 or less in order that the vanadium shall be present in the solution in the form of vanadyl ion ($VO_2+$). Above a pH of about 1.8 at least a portion of the vanadium will be present as metavanadate, which does not accumulate in a cation exchange bed. This is known from the prior art, which also teaches that a desirable lower limit for the pH of the solution to be contacted with the resin bed is about —0.3. In the case of the waste acid streams derived from adipic acid production as discussed above, this pH limitation normally means that some dilution with water is necessary to raise the pH of the solution to the desired range. Lowering the pH is ordinarily not required.

Another significant factor is the temperature to which the resin bed is exposed during the exhaustion (ion accumulation) and elution steps. Particularly when nitric acid (a strong oxidizing agent) is employed in eluting the bed, there is a tendency toward resin deterioration which is enhanced by elevated temperature. It is, accordingly, recommended that the temperature of the resin bed be kept below about 50° C., preferably below about 42° C., during all the processing steps, It is to be noted in this connection that when elution is carried out with nitric acid of much greater than about 30 weight percent concentration, a temperature rise due to simple heat of dilution results when the acid is first introduced into the bed and there comes into contact with purer water or an aqueous solution which is much more dilute than the nitric acid being introduced. This temperature rise can be controlled by employing, as the eluting acid, nitric acid of not more than about 55 weight percent concentration, preferably 30 to 35 percent. Suitable alternatives can be employed if desired, such as pre-cooling the nitric acid before elution. These considerations apply to processes in which elution is accomplished with nitric acid, which will be the case normally when the process of the invention is being applied to purge waste acid derived from adipic acid production and it is desired to recycle the recovered copper and vanadium to the adipic acid production process as the nitrate salts. When the invention is being applied to other processes, in which a non-oxidizing mineral acid can be employed for elution, the concentration limitations and temperature limitation just referred to do not apply.

As already discussed above, the polyphosphate employed in the process for complexing the iron is preferably polyphosphoric acid, which is preferably employed in accordance with the concentration limit and the polyphosphoric acid:iron ratio mentioned above. In that emmobidment of the invention in which the polyphosphoric acid is incorporated continuously into the liquid being fed into the ion exchanged bed, the polyphosphoric acid should be incorporated into the solution in an amount such that the ratio of polyphosphoric acid to dissolved iron is at least about 16:1 by weight, preferably 20:1 to 30:1. Under these conditions complete selective complexation of the iron is obtained without significant (undesired) complexation of the copper. In that embodiment of the invention in which the iron is allowed to accumulate in the bed along with cooper and vanadium, with polyphosphoric acid being employed periodically to cleanse the bed of the iron, the amount of polyphosphoric acid employed, and its concentration, are less important. In order to avoid unnecessary loss of any copper which may be in the bed at the time of polyphosphoric acid treatment, it is preferred to employ polyphosphoric acid in a concentration of less than about one weight percent in the liquid passing through the bed during the cleansing cycle. However, higher concentrations can be employed if the copper content of the bed is low at the time of treatment or if some loss of copper can be tolerated. The only adverse effect of employing very low concentrations of polyphosphoric acid is simply that a large quantity of the polyphosphoric acid solution will be required to completely cleanse the bed of iron, or alternatively, that some iron will be left in the bed at the end of the treatment. Both of these effects can be tolerated if desired, but as a practical matter it is convenient to employ a polyphosphoric acid of about 0.01 to about 1.0 weight percent concentration during cleansing of the bed of its iron content.

In employing that embodiment of the invention which incorporates continuous admixture of polyphosphate into the liquid fed into the resin bed, the mode of operation, except for the addition of polyphosphate, differs in no way from the ion exchange processes well known in the art. That is, with the feed liquor containing polyphosphate in a suitable concentration as discussed above, the liquor is passed through the iron exchange bed in the hydrogen form until the bed is depleted as indicated by a breakthrough of copper or vanadium (normally vanadium breaks through first), with the liquid discharged from the bed and containing the iron as the polyphosphate complex being discarded or otherwise disposed of. When the bed is exhausted, it is eluted with nitric acid or one of the other strong mineral acids, the eluate containing the copper and vanadium being recycled to the, for example, adipic acid production process or else worked up by methods outside the scope of this invention to recover the copper and vanadium. The bed is then suitably washed with pure water and another exhaustion cycle is begun. Typically, of course, two beds are employed in parallel, one being switched to the exhaustion cycle while the other is being eluted.

Inasmuch as vanadium breakthrough tends to occur before copper breakthrough, efficiency of the operation can be enhanced by employing two resin beds in series, allowing the first bed to operate until copper breakthrough (as distinguished from vanadium breakthrough) occurs and accumulating some vanadium in the second bed. Thus the first bed accumulates copper and vanadium, the second accumulates vanadium, and complexed iron passes through both beds and is discharged with the waste liquor.

Several variations are possible in employing that embodiment of the invention in which iron is allowed to accumulate in the resin bed to be removed periodically by flushing with a polyphosphate such as polyphosphoric acid. In this embodiment the polyphosphoric acid is not incorporated normally into the liquid being fed into the bed during the exhaustion cycle. Rather, the iron, copper, and vanadium (or iron and a member of the group consisting of copper and vanadium if the feed liquor does not contain both copper and vanadium) are allowed to accumulate in the resin bed during the exhaustion cycle. When the bed is exhausted as indicated by a breakthrough of copper or vanadium, it is eluted with, for example, nitric acid until a significant concentation of iron appears in the eluate. It is not critical that no iron at all be allowed to elute with the copper and vadium, but it is desired to retain most of the iron in the bed and not allow it to be eluted with the copper and vanadium. The acid elution, it has been discovered, removes copper and vanadium selectively before iron is removed, because it has been found that iron is much more resistant to elution. When iron is detected in the eluate, the bed is advantageously washed with water. At this stage aqueous polyphosphoric acid can be passed through the bed, if desired, to remove the iron. Advantageously, however, this is done only periodically; that is, several cycles of exhaustion and elution are carried out before the polyphosphoric acid treatment, the iron loading of the bed being continuously increased until a noticeable shortening of the time required for breakthrough of copper or vanadium indicates that an increasing accumulation of iron is reducing the adsorptive capacity of the bed for these cations. This mode of operation minimizes polyphosphoric acid consumption and also maximizes the time available for use of the bed on the exhaustion cycle.

In this embodiment of the invention, as in the first embodiment discussed above, there are advantages to employing a second resin bed in series with the first, when the aqueous feed liquor contains both copper and vanadium, to recover vanadium which escapes the first bed. When operating two beds in this manner, the first bed accumulates iron and copper along with some vanadium, and the second accumulates predominantly vanadium. Elution of the first bed is carried out whenever a copper breakthrough is observed in the liquid being discharged from it to the second bed. The second bed can either be eluted at the same time as the first bed, or at less frequent intervals.

The following examples are given to illustrate the invention further. It will be understood that these examples are given by way of illustration, and that many variations therefrom are possible within the scope of the invention.

EXAMPLE I

The following illustrates that embodiment of the invention in which a polyphosphate (sodium pyrophosphate in this instance) is continuously incorporated into the liquid being fed into the ion exchange bed. Copper and at least a portion of the vanadium are retained in the bed while the iron is complexed and passes through the bed without being retained.

A cylindrical resin bed was employed, approximately 15 mm. in diameter and 220 mm. in length, oriented vertically. The bed was contained in a cylindrical vessel of glass, 16 mm. in diameter and 400 mm. in length. The vessel was provided with suitable connections at the ends for introducing feed liquor, withdrawing the deionized waste liquor, and introducing and withdrawing eluant and eluate. The resin was "Amberlyst–15", manufactured by Rohm and Haas Chemical Company and consisting of a sulfonated polystyrene cross-linked with approximately 25 weight percent divinyl benzene. Prior to use, the resin had been converted to the hydrogen form by passing 35 weight percent nitric acid through it, in an amount of about 4 volumes of the 35% acid solution per volume of resin bed.

The liquid to be processed through the bed was so-called "purge waste acids," a waste mother liquor obtained after crystallization and separation of adipic acid from the reaction product obtained in oxidizing a mixture of cyclohexanone and cyclohexanol with nitric acid in the presence of a catalyst comprising cupric nitrate and ammonium metavanadate. This purge waste acid had the following composition, in weight percent except as otherwise indicated:

| | |
|---|---|
| Copper, cupric ions calculated as copper | 0.584 |
| Adipic acid | 5 |
| Succinic acid | 6 |
| Glutaric acid | 11 |
| Iron, ferric ions calculated as iron (p.p.m.) | 40.8 |
| Nitric acid | 6–8 |
| Water | Remainder |

The pH of the purge waste acid was approximately −0.2. The purge waste acid just described, undiluted, was mixed with sodium pyrophosphate $$(Na_4P_2O_7 \cdot 10H_2O)$$

in an amount such that the resulting mixture contained approximately 1.4 weight percent pyrophosphate moiety. Care was taken that, after incorporation of the pyrophosphate, the liquid was not allowed to stand more than about 2 hours before being passed through the resin bed. This was for the reason that previous studies had shown that after about this period of time polyphosphate begins to hydrolyze to orthophosphate in these acidic aqueous solutions, the hydrolysis being accelerated at elevated temperatures.

The purge waste acid, undiluted except for incorporating the pyrophosphate into it, was then passed through the resin bed at a temperature of about 20° C. and at a rate of about 0.13 volume of liquid per volume of resin bed per minute. Approximately 15 minutes after introduction of the liquid into the bed was begun, the effluent liquid was sampled and analyzed, and was found to contain 0.1470 weight percent copper and 0.0039 weight percent iron. The test was continued for approximately 10 minutes more, at the end of which period the effluent liquid contained 0.0950 percent copper and 0.048 percent iron. The exhaustion cycle was stopped at this point. Of the copper and iron passed through the bed during this period of time, approximately 75 percent of the copper was found to have been accumulated in the bed, while less than 5 percent of the iron fed had been so accumulated. Elution of the resin bed with 35 weight percent nitric acid at a temperature of 20° C., in an amount of 0.13 volume of this nitric acid solution per volume of resin bed, resulted in the recovery, in the eluate, of substantially all of the copper which had been accumulated in the bed.

After elution, the resin bed was washed with distilled water and was in suitable condition for a second exhaustion cycle.

EXAMPLE II

The experiment of Example I was repeated with all conditions being the same as in Example I except that, prior to passing the purge waste acid solution through the resin bed, it was diluted with water to 75% of the concentration employed in Example I. The pH of the diluted liquor was approximately 0.2. The ratio of polyphosphate to undiluted purge waste acids was the same as in Example I. The copper content of the bed effluent was 311 parts per million as compared with 1470 parts per million in Example I. No iron was retained in the resin bed in either Example I or Example II.

EXAMPLE III

The experiment of Examples I and II was repeated with all conditions being the same as in Examples I and II except that before being passed through the resin bed the purge waste acid was diluted to 33% of its initial concentration with water. The pH after dilution was approximately 0.5. The ratio of polyphosphate to undiluted purge waste acids was the same as in the previous two examples. Copper content of the effluent liquid was less than one part per million, and 4% of the iron contained in the purge waste acid was retained in the resin bed.

EXAMPLE IV

A vertical cylindrical resin bed was employed, having a length:diameter ratio of approximately 0.9:1. It was contained in a vessel provided with the connections normally employed in the art for introducing feed liquor, withdrawing waste liquor, introducing eluant, and withdrawing an eluate stream during elution. The resin was "Amberlite IR–200," manufactured by Rohm and Haas Company and consisting of a sulfonated polystyrene cross-linked with approximately 25 weight percent divinyl benzene. Prior to use, the resin had been converted to the hydrogen form by washing it with 55 weight percent aqueous nitric acid and then washing with water.

The liquid to be processed through the bed was "purge waste acids" of the same type as described in Example I, which had been diluted with water prior to ion exchange treatment. Immediately prior to passing the diluted liquid through the resin bed, polyphosphoric acid having a $P_2O_5$ content of approximately 82 to 84 weight percent was incorporated into the diluted solution, which then had the following approximate composition, in weight percent except where otherwise indicated:

| | |
|---|---|
| Copper, cupric ions calculated as copper | 0.1–0.2 |
| Vanadium, vanadyl ions calculated as vanadium | 0.003–0.015 |
| Adipic acid | 1.3–1.7 |
| Succinic acid | 1.7–2.4 |
| Glutaric acid | 3–5 |
| Iron, ferric ions calculated as iron (p.p.m.) | 10–20 |
| Nitric acid | 2–4 |
| Polyphosphoric acid | 0.02 |
| Water | Remainder |

The pH of the diluted mixture was approximately 0.5.

The aqueous mixture just described, at a temperature of approximately 40° C., was then passed through the resin bed at a rate of 0.8 volume of diluted liquor per volume of resin bed per hour, for approximately 1.25 hours. At the end of this time, significant quantities of copper (i.e. about 0.01 weight percent calculated as copper) began to be detectable in the waste liquor being discharged from the bed, as determined by ethylenediamine tetracetic acid titration for copper. The iron content of the waste liquor discharged from the bed was approximately 10 to 20 p.p.m. calculated as iron throughout substantially the entirety of the exhaustion cycle just described.

After the copper breakthrough just described had taken place, the exhaustion cycle was terminated and the resin bed was washed with water to remove dibasic acids and then eluted with 55 weight percent aqueous nitric acid which was introduced into the bed at a temperature of approximately 42° C. The maximum bed temperature observed during the elution was approximately 49° C., some temperature elevation having taken place during the elution process. Approximately 3 volumes of the eluant acid solution weer employed per volume of the resin bed. From chemical analyses of the eluant it was calculated that over 95% of the copper and 60% of the vanadium contained in the aqueous solution fed into the resin bed had been adsorbed by the resin and subsequently recovered in the eluate. Of the iron introduced into the bed, substantially 100% was removed with the waste liquor discharged from the bed while essentially none was recovered in the eluate.

By shortening the length of the exhaustion cycle it is possible to increase the recovery of vanadium.

Alternatively, the addition of a second resin bed in series with the first, the resin being of the same type as that contained in the first bed, increases the percent recovery of vanadium, the bulk of the copper along with a portion of the vanadium being retained in the first bed and additional vanadium being retained in the second bed.

EXAMPLE V

A feed liquor identical with that described in Example IV, but without the polyphosphoric acid admixture, is passed through a resin bed identical with that described in Example IV. Bed temperature and liquid flow rate are as in Example IV. After about 1.5 volumes of liquid per volume of resin bed have been passed through the bed, a breakthrough of copper is detected as evidenced by the appearance of about 0.01 weight percent of copper in the liquor being discharged from the bed. This liquor contains substantially no iron. When this breakthrough has been detected, passage of the feed liquor through the bed is discontinued and the bed is eluted with 3 volumes of 55 weight percent aqueous nitric acid per volume of resin bed. The quantity of eluant is controlled by terminating elution at the time when copper content of the eluate has decreased to about 0.05 weight percent. After cessation of the elution cycle, the bed is flushed with water and a second exhaustion cycle is initiated. This cycle is continued until copper breakthrough occurs as in the first exhaustion cycle, and acid elution is again carried out as before. Again, as before, the iron contained in the feed liquor is retained in the resin bed during both the exhaustion and the elution steps.

After a total of five cycles of exhaustion and elution as described above, aqueous 0.02–1 weight percent polyphosphoric acid prepared by dissolving polyphosphoric acid containing 82–84 weight percent $P_2O_5$ in the diluted purge waste acid is passed through the bed at a temperature of about 40° C. and at substantially the same flow rate as that employed in the exhaustion cycle. Iron is present in the aqueous polyphosphoric acid discharged from the bed during this cleaning cycle, which is continued until a decrease in iron content of the discharged liquid indicates that the cleansing of iron from the bed is substantially complete.

At the conclusion of several cycles of exhaustion, elution, and polyphosphoric acid cleansing as described above, about 95 percent of the copper and about 60 percent of the vanadium contained in the feed purge waste acids are recovered in the eluate and over 80 percent of the iron is discharged with the waste polyphosphoric acid in the cleansing cycle.

By adding a second resin bed in series with the resin bed just described, the waste liquor discharged from the first bed being passed through the second before finally discarded, the recovery of vanadium in particular is enhanced. In this arrangement, the first bed is advantageously eluted with acid when copper breakthrough from it is detected while the second bed is eluted at such time as the vanadium contained in the effluent from it rises above any desired predetermined level. The polyphosphoric acid cleansing operation is required only for the first of the two beds.

The embodiments of the invention in which an exclusive property or privilege is claimed are defined as follows:

1. A method for resolving an aqueous feed liquor containing ions of iron and at least one member of the non-ferrous group consisting of copper and vanadium cations into a waste liquor containing the major portion of said iron and an eluate containing the major portion of said non-ferrous ions, which process comprises:
   (a) passing said feed liquor through a bed of a cation exchange resin in the hydrogen form, said non-ferrous ions being thereby accumulated in said bed while said liquor with a reduced content of said non-ferrous ions is discharged therefrom;
   (b) periodically eluting said bed with a strong mineral acid to remove said non-ferrous ions from said bed in the resulting eluate;
   (c) controlling the quantity of mineral acid employed in each of said elutions at an amount no higher than that at which a significant concentration of dissolved iron appears in the eluate; and
   (d) during a time interval between said periodic elutions, passing through said bed an aqueous solution containing polyphosphate ions, whereby iron contained in the resin bed and in the liquid-filled interstices therein is solubilized as a polyphosphate complex which is discharged in solution in the waste liquor discharged from said bed.

2. The method of claim 1 further characterized in that the feed liquor has a pH between about −0.3 and 1.8, the mineral acid is nitric acid of up to 55 weight percent concentration, resin bed temperature during all the recited steps is controlled below about 50° C., the solution containing polyphosphate ions is aqueous polyphosphoric acid, the cation exchange resin is a sulfonated polystyrene ion exchange resin, and the iron ions are in the ferric state.

3. The method of claim 2 wherin the sulfonated polystyrene resin is cross-linked with divinyl benzene in an amount of about 8% to 25% of the resin by weight.

4. A method for separating ions of at least one non-ferrous member of the group consisting of copper and vanadium in cationic form from an aqueous feed solution containing iron ions, which method comprises:
   incorporating polyphosphate ions into said solution in an amount such that the ratio of polyphosphate moiety to iron in the resulting polyphosphate-containing solution is between about 16:1 and 30:1 by weight;
   passing said polyphosphate-containing solution through a cation exchange resin in the hydrogen form;
   accumulating said non-ferrous ions in said resin beds; and
   discharging from said bed said polyphosphate-containing solution containing said iron ions in solution in the form of the iron polyphosphate complex.

5. The method of claim 4 further characterized in that the feed solution has a pH between about −0.3 and 1.8, the polyphosphate is present in the polyphosphate-containing solution as polyphosphoric acid in a concentration up to about 1% by weight, resin bed temperature is controlled below about 50° C., the iron ions are in the ferric state, and the cation exchange resin is a sulfonated polystyrene resin.

6. The method of claim 5 wherein the sulfonated polystyrene ion exchange resin is cross-linked with divinyl benzene in an amount of about 8% to 25% of the resin by weight.

7. A method for separating ions of at least one non-ferrous member of the group consisting of copper and vanadium in cationic form from an aqueous feed solution containing ferric ions, which method comprises:
   (a) passing said feed solution through a bed of a cation exchange resin in the hydrogen form;
   (b) accumulating said non-ferrous ions and said ferric ions in said ion exchange bed;
   (c) eluting said bed periodically with a strong mineral acid to recover said non-ferrous ions in the eluate;
   (d) controlling the quantity of mineral acid employed in each of said elutions below that amount at which significant detectable quantities of dissolved iron appear in the eluate; and
   (e) periodically cleansing said bed of iron accumulated therein by passing therethrough an aqueous solution of polyphosphoric acid.

8. The method of claim 7 further characterized in that the feed solution has a pH between about −0.3 and 1.8, the strong mineral acid is nitric acid of up to about 55% concentration by weight, the resin bed temperature is controlled below about 50° C. during all the recited steps, the iron ions are in the ferric state, and the ion exchange resin is a sulfonated polystyrene resin.

9. The method of claim 8 further characterized in that the polystyrene resin is cross-linked with divinyl benzene in an amount of about 8% to 25% of the resin by weight.

10. The method of claim 9 further characterized in that the aqueous feed liquor is a liquor derived from a process in which adipic acid is recovered by crystallization from the product obtained by the nitric acid oxidation of at least one member of the group consisting of cyclohexanol and cyclohexanone, said liquor containing nitric acid, iron, copper, vanadium, and lower alkandioic acids.

References Cited

UNITED STATES PATENTS

| | | | |
|---|---|---|---|
| 2,791,566 | 5/1957 | Jeffers | 252—476 |
| 3,106,450 | 10/1963 | Van den Berg | 23—102 |
| 3,148,210 | 9/1964 | Johnson et al. | 252—413X |
| 3,161,603 | 12/1964 | Leyshon et al. | 252—413 |
| 3,186,952 | 6/1965 | Brubaker et al. | 252—413 |

HERBERT T. CARTER, Primary Examiner

U.S. Cl. X.R.

23—23, 102, 105; 252—412, 413